3,325,419
AQUEOUS THORIA-URANIA SOL

Forrest R. Hurley, Ellicott City, Md., Melvin Tecotzky, Palo Alto, Calif., and Milton C. Vanik, Baltimore, Md., assignors to W. R. Grace & Co., New York, N.Y., a corporation of Connecticut
No Drawing. Filed June 24, 1963, Ser. No. 290,171
The portion of the term of the patent subsequent to May 28, 1980, has been disclaimed
6 Claims. (Cl. 252—301.1)

This application is a continuation-in-part of application Ser. No. 1,160 filed Jan. 8, 1960, now abandoned.

This invention relates to thoria-urania sols and to methods of preparing them. In one specific aspect, it relates to a stable mixed thoria-urania sol in which both metal species are in the plus IV oxidation state and are isomorphous. These sols are suitable for use in aqueous homogeneous reactors.

Aqueous homogeneous reactors may be one of three types: burner reactors, converter reactors or breeder reactors. Burner reactors are those in which fissionable materials are consumed as fuel but virtually no new fuel is generated. Converter reactors are those which produce a different fissionable fuel than is destroyed in the fission process. Breeder reactors are those which produce more of the same type fissionable fuel as is being consumed in the reactor. A converter reactor becomes a breeder reactor if there is a net gain in the production of fissionable fuel and the fuel is subsequently burned in the core.

The nuclear reactions involved in the breeder reactor using a mixed thoria-urania fuel are typical and are well known. In a two region reactor, for example, a core of uranium solution is surrounded by a blanket of thorium 232. As the uranium in the core fissions, it gives off neutrons, some of which are absorbed by the thorium 232 to convert it to thorium 233. Thorium 233 decays with a half life of 23.3 minutes to yield protactinium 233 which in turn decays to uranium 233. The uranium 233 is a fissionable uranium isotope and is itself a suitable fuel. These breeder reactors may also be designed as single region reactors which contain a homogeneous mixture of fissionable and fertile materials in a moderator. These reactors differ from the two region reactors in that they have larger reactor diameter in order to minimize neutron losses. They normally contain the fuel plus fertile material in concentrations as high as 300 grams per liter.

Aqueous homogeneous reactors have several advantages over the conventional types of reactors used in nuclear power development. These advantages stem partly from the fluid nature of the fuels and partly from the homogeneous mixture in the moderator. The most obvious advantage of these systems resides in the high power density. That is, because of the homogeneous nature of the reactor fuel fluid, there is essentially no heat transfer barrier between the fuel and the coolant. These reactors also compare favorably with heterogeneous reactors in that a high burn up of fuel is possible. Because the fuel is liquid, continuous removal of poisons that cause damage to fuel elements is possible. New fuel can be continually added to the system thereby permitting unlimited burn-up. The simplicity of fuel preparation and reprocessing resulting from the use of aqueous homogeneous colloidal suspensions as fuel and the related ease with which fuel can be continually added to and removed from the suspension also tend to make these types of reactors attractive. Neutron economy in the liquid fuel system is improved by decreasing the absorption of neutrons by the cladding and structural materials which are present in the reactor core of the heterogeneous reactors in that no metal clad is needed in an aqueous fuel system. The design of these reactors makes rapid removal of fission product poisons possible.

In the reactor systems of the prior art, an aqueous solution of uranyl sulfate is used as the fuel in the aqueous homogeneous reactors. These solutions have not been particularly satisfactory as neutron sources because they are corrosive at temperatures of 250 to 300° C. They have also been found to be unstable at these temperatures.

Some reactors use uranium phosphate in concentrated phosphoric acid as the reactor fuel. These systems take advantage of the fact that phosphorus has a lower neutron absorption cross-section than sulfur. However, this fuel system suffers from the same disadvantages as the uranyl sulfate fuel system in that sulfate and phosphate in concentrated acid at reaction temperatures are corrosive toward most metals and alloys except the noble metals.

The potentialities of systems of solid uranium compounds as reactor fuels have been recognized for some time and considerable effort has been directed toward the development of $UO_3$ slurries as reactor fuels.

One disadvantage of the slurries as fuels is obvious in that slurries require constant agitation to prevent solids separation. The equipment also tends to be eroded by the movement of these solid particles in the fuel element of the reactor. These solids frequently tend to be subject to attrition in the operation of the reactor.

Thoria-urania sols having homogeneous particles of colloidal size, on the other hand, do not present the disadvantages of urania or thoria slurries when used in reactors. There is, for example, no need to furnish agitation to prevent solids separation. Because of their smaller size, the particles are not subject to attrition. The problem of equipment erosion is almost non-existent. Sols have relatively low viscosity and thus can be easily pumped.

In our copending application S.N. 756,547, now U.S. Patent 3,091,592, there is disclosed a process for preparing thoria-urania sols containing a maximum of 10% urania. Thus, up to the time of our discovery it has been known to prepare thoria-urania sols with a maximum of only 10% urania. This is a severe limitation on the usefulness of these sols. We have found a method whereby thoria urania sols having the components in any desirable proportion can be prepared. Our method involves preparing a thoria-urania sol in which both the thoria and urania are in the plus IV oxidation state and which is stable at the operating temperature of this type of system. Thoria and urania sols of the prior art have been characterized by a tendency to gel or precipitate on heating. The organic dispersing agents which might normally be used in making sols cannot be used in the fuel areas of homogeneous reactors because they tend to degrade under the strong radiation flux. Other additives must be selected with extreme care. Elements of high neutron capture cross-section must be avoided because they reduce the efficiency of the system. Electrolytes should be avoided because they tend to precipitate the urania and because of their highly corrosive character especially at high temperature. These difficulties have been overcome by our new method.

In accordance with the present invention, it is now possible to prepare thoria-urania sols of any suitable thoria-urania content in which both the thoria and urania are in the plus IV oxidation state. These sols are free from undesirable neutron capture components and are stable at the temperatures of aqueous homogeneous reactors, i.e., at least up to 150° C. The particles or micelles of the thoria and urania sols of this invention are of such mall size that there is no tendency to settle and attrition is not an important problem. These sols are not abrasive and their low viscosity facilitates pumping.

The sols, as they are prepared, tend to gel on heating to high temperatures. To impart greater hydrothermal stability as well as other desirable properties, the sol particles are clad with silica or some other suitable material. The entire sol is then stabilized by the addition of a small amount of alkali metal hydroxide. The preferred process of coating or cladding comprises adding a layer of reactive silica to the sol particles followed by stabilization through heating under non-evaporative conditions and the addition of an alkali metal hydroxide. The thoria-urania sols in which both the thoria and urania are in the plus IV oxidation state and which are clad with silica are particularly desirable in that the silica and alkali metal have low neutron capture cross sections and thus are not a factor in neutron economy. In order to obtain the desired characteristics, the thoria-urania sol cladding step should be carried out carefully under controlled conditions.

The thoria-urania sols in which both the thoria and urania are in the plus IV oxidation state have several advantages over thoria-urania sols in which the urania is in the plus VI oxidation state.

In the preparation of these sols by electrodialysis for example, as the pH of the solution changes during sol formation, the uranium IV particles form first. As the pH increases, thoria particles are formed. This order of precipitation results in a thoria-urania sol in which the thoria particles surround the urania particles and a sol with an improved stability results. This order of particle formation follows the solubilities of the corresponding hydrous oxide. In contrast, uranium VI particles are not formed in electrodialysis until after most of the thorium in solution has come out as particulate matter.

Thoria and urania in the plus IV state are isomorphous. When the materials in this state are used to form sols, the composition of these sols can be varied over the entire range of urania and thoria concentration. This is not possible when the urania is in the plus VI oxidation state both because of its solubility in that state and because of structural differences. In the plus VI state a maximum of 10% urania can be incorporated in the sol particles. On the other hand, using the two materials in the plus IV state and the process of our invention, it is possible to prepare a sol containing as much as 99% urania if so desired. This feature is advantageous in that it allows great flexibility in the preparation of fuel elements for aqueous homogeneous reactors.

It has been observed that $UO_2$ is more stable and more desirable than the other uranium oxides in heterogeneous reactors. Colloidal sized particles also exhibit these desirable qualities.

THORIA-URANIA SOL PREPARATION

The thoria-urania sols of this invention in which both components are in the plus IV oxidation state have low viscosity and are susceptible to cladding. In addition, the particles produced are of generally uniform size within the range of about 200 to 1125 Angstrom units. Very few of the particles are outside the range of 200 to 700 Angstrom units. Suitable thoria-urania sols can be prepared by gradually removing anions from dilute solutions containing salts of thorium and uranium while maintaining the system at elevated temperatures. Preferred techniques for anion removal are: (1) electrodialysis using anion permeable membranes, (2) dialysis using an anion permeable membrane, and (3) anion exchange resins in the hydroxide form.

In the present invention, aqueous solutions of salts of thorium and uranium where both components are in the plus IV oxidation state are used as starting material. It is preferable to use salts which are sufficiently soluble to give a 5 to 10% equivalent $UO_2$–$ThO_2$ solution. The chloride is the most desirable salt.

Thoria-urania sols in which both the thoria and urania are in the plus IV oxidation state and which are prepared by the method described below are characterized by relatively dense, generally spherical particles having colloidal dimensions and exhibiting no tendency to agglomerate at ambient temperature. However, on heating the particles tend to accrete which makes them unsuitable for use in nuclear reactors as prepared. Cladding provides a method whereby these sols can be rendered satisfactorily stable.

The sol particles are clad with a protective layer of silica and then stabilized by maintaining at a prescribed pH by the addition of alkali metal hydroxide. Certain steps should be followed in the cladding operation to insure stability of the final product.

The parent sol and cladding solution should be relatively dilute to insure proper and rapid mixing. A cladding sol containing about 1–2% silica concentration is generally adequate to coat a parent sol having about 10% solids content. The silica sols for cladding should be freshly prepared so that the silica particles are in the "active" state. The silica sol can be prepared by any of the known methods.

The thoria-urania and silica sols are mixed together rapidly and with thorough mixing so that the cladding takes place instantaneously. Following cladding the sol is stabilized by the addition of a sufficient amount of an alkali metal hydroxide to bring the pH of the solution to a value between 7.0 and 11.0 and preferably between 7.5 and 9.0. At a pH of about 11, the silica begins to redissolve so that the amount of alkali added should be enough to insure stability but not enough to dissolve the silica. Though the alkali metal hydroxides, and specifically sodium hydroxide, are generally used in this step, other bases may be used. However, the selected base should be composed of low thermal neutron cross section elements and should be stable under reactor conditions.

The amount of silica used in cladding should be sufficient to provide a coating of silica about 30 to 120 Angstroms thick. We have found that a coating in this range imparts the desired characteristics to the thoria-urania particles.

CONCENTRATION

The sols prepared by our method can be concentrated by evaporation to a solids content of up to about 50%. It is preferred to add fresh sol continuously during evaporation to avoid deposition of the solid material on the sides of the vessel. The finished sols can be diluted to any lower solids content by the addition of deionized water or water of low ionic content. Concentration of the sol can also be accomplished by centrifuging the sol, separating the solids and redispersing in a smaller quantity of water. This technique is also useful for changing the dispersion medium such as, for example, changing the medium from regular water to heavy water.

Since the sols of this type tend to coagulate on the addition of electrolytes, care must be taken to keep the electrolyte content at a minimum. Measurement of conductivity is a convenient method for determining the concentration of undesirable ionic material. Conductivities of the sols of this invention range between $10^{-5}$ and $10^{-2}$ mho/cm. Since the stability of any given sol is improved by reduction in ionic content, conductivities in the lower part of the range are preferred.

The preferred hydrothermally stable thoria-urania sols of our invention have a specific conductance of less than that of a pure alkali metal hydroxide solution of the same alkali concentration. Conductivity is measured at 25° C. and one kilocycle using a standard conductivity bridge with a cell inserted in one arm. The cell constant is determined using an 0.01 and 0.02 normal KCl solution (the conductivity of which is determined from conductivity tables) and the following equation:

$$K = L_{KCl}R$$

where:

K = the cell constant in cm.$^{-1}$
R = bridge resistance in ohms
L = conductance in mho/cm. of the standard KCl solution.

The conductance L of the sol in question can be determined by measuring its resistance in the same cell and using the equation:

$$L_{sol} = \frac{K}{R}$$

where:

K = the cell constant
R = resistance in ohms.

When subjected to aging or to certain types of heat treatment, sols undergo densification in which the open gel structure is altered and the density of the individual particles increased. Densification of the thoria-urania particles takes place during the formation of the sol and to some extent, during subsequent treatment. For instance, autoclaving will densify the particles to some extent and some further densification occurs during use due to the high temperatures prevailing in the reactor. The maximum concentration of the thoria-urania which may be obtained in the sol is primarily dependent on pH, particle size distribution, particle density and, when the sol is clad, the thoria-urania to silica ratio. At a given pH, weight percent concentration and ratio of thoria-urania to silica in a clad sol, the sol with the largest particle size will have the lowest viscosity. Since thoria-urania is more dense than silica, the higher the thoria-urania to silica ratio, the higher the weight percent solid matter will be at the same viscosity. In general, sols of good stability have low viscosity.

The viscosity of the sols was determined with an Ostwald viscometer. The viscometer was kept in a constant temperature bath at 25° C. A 10-ml. sample of the sol was used for viscosity studies. The relative viscosity of a sol was determined using water as the standard, assuming its viscosity to be 1, and using the following formula:

$$\frac{n_1}{n_2} = \frac{d_1 t_1}{d_2 t_2}$$

where:

$n_1$ = the relative viscosity of the sol
$n_2$ = 1 (the viscosity of water)
$d_1$ = density of the sol at 25° C.
$t_1$ = time of flow in seconds of sol in the viscometer
$d_2$ = 0.997 (the density of water at 25° C.)
$t_2$ = time of flow in seconds of water in the viscometer.

After the relative viscosity has been determined, the absolute viscosity in poises can be obtained by multiplying the relative viscosity by the absolute viscosity of water at 25° C. (0.00895 poise).

The thorium and uranium content of our sols was determined by fluorescent X-ray spectroscopy using the technique described in American Society of Testing Materials, "Symposium on Fluorescent X-Ray Spectrographic Analysis," Special Technical Publication 157, 1954.

Electron micrographs were made by conventional techniques.

In referring to our dispersions of thoria-urania in water, we mean to include heavy water as well as regular water. We also mean to include uranium 233 and 235 as well as normal uranium which is principally uranium 238 in our discussion of urania.

Our invention will be further explained by the following specific but non limiting examples.

Example I

A charge of 603 ml. of thorium chloride solution containing 305.4 grams per liter of thorium or a total of 184 grams of thoria and 470 ml. of a uranium IV chloride solution containing 34.1 grams per liter of uranium or a total of 16 grams of uranium were mixed in a heated reservoir. The solution was diluted to 4 liters with de ionized water. The solution was circulated at a rate of approximately 150 cc./min. to the cathode compartment of a cell divided by an anion exchange membrane of Nepton AR-111A. The electrode compartments each had a capacity of approximately 350 ml. and each was equipped with a stirrer. Platinum electrodes were positioned on each side of the membrane a distance of about ⅛" from the membrane. The temperature in the reservoir vessel was maintained at about 100° C. The mixed chloride solution was withdrawn from this vessel at the rate of 150 cc./min. to a cooled heat exchanger and pumped into the above described cell. The temperature of the incoming solution was controlled to maintain a cell temperature of about 25 to 32° C. The solution leaving the cell was passed through a heat exchanger where it was heated to about 100° C. and then returned to the reservoir. Evaporation losses were minimized by equipping the cell with a condenser and by periodically adding deionized water to take care of the unavoidable losses.

Circulation of the solution was continued over a total period of 19¼ hours with overnight interruptions during which periods the temperature was maintained at 70° C. During electrodialysis the amperage dropped from a value of 10 to a value of 1.2, and the pH in th cell rose from a value of 0.77 to a value of about 4.43.

On completion of the electrodialysis this sol had a density of 1.046, a viscosity of .00954 poise and a conductance of $6.45 \times 10^{-3}$ mho/cm. To lower the electrolyte concentration the sol was passed through a column containing a mixed bed anion-cation exchange resin. The final pH was adjusted to 5.2 and the specific conductance was $1.07 \times 10^{-4}$ mho/cm. The mixed thoria-urania sol was found to precipitate at a pH of 8.8 on the addition of 0.1 normal sodium hydroxide and at 8.9 on the addition of dilute ammonium hydroxide. The sol was found to contain 2.43 grams per liter of uranium and 37.98 grams per liter of thorium or a 4.04% sol.

The thoria-urania sol had the characteristics of a $ThO_2$ sol. The particles were spheroidal and ranged in size from 200 to 1125 angstroms with very few of the particles exceeding 675 angstroms. Several of the particles had regions of higher density, indicating the $ThO_2$ was surrounding the $UO_2$. The viscosity of the sol relative to water was 1.025 at 25° C.

Example II

Although the unclad thoria-urania sol, in which both the thoria and urania were in the plus IV oxidation state, was stable at moderate temperatures, the hydrothermal properties of the sol were improved by cladding the sol with silica. Briefly, the process comprises reacting the thoria-urania sol with a silica sol. A suitable silica sol containing 2% $SiO_2$ can be prepared by passing a sodium silicate solution through a column containing Dowex 50 cation exchange resin in the hydrogen form. In operation a thoria-urania sol was heated to 40° C. with stirring. The silica sol was added rapidly with good mixing. The pH of the solution dropped as a result of the addition of the silica sol. The solution was then adjusted to a pH of 9 by the dropwise addition of 1 normal sodium hydroxide. The clad sol was refluxed overnight with stirring and after it had cooled it was passed through a mixed bed ion exchange resin and deionized. The pH of the clad sol was then brought up to 8.0 by dropwise addition of 1 normal sodium hydroxide.

The silica cladding or coating can be seen by the electron microscope since there is a density difference between the thoria-urania and the silica. The electron micrograph of the clad thoria-urania sol showed that the particles were virtually 100% clad. The coating was smooth and did not show the particulate composition of the substructure of the clad. The thickness of the coating was about 70 to 150 angstroms. The silica-clad thoria-urania sol was heated at 300° C. for various periods of time in glass pressure vessel to determine the hydrothermal stability of the sols. Results of these tests are given in Table I.

TABLE I

| Run | Sol | Hours | Temp., °C. | Atmosphere | Sol Fluidity |
|-----|-----|-------|-----------|------------|--------------|
| | $ThO_2-UO_2$ | 65 | 300 | $O_2$ | Fluid. |
| | $ThO_2-UO_2$ | 65 | 300 | $H_2$ | Do. |
| | $ThO_2-UO_2$ | 300 | 300 | $O_2$ | Do. |
| | $ThO_2-UO_2$ | 300 | 300 | $H_2$ | Do. |

*Example III*

The thoria-urania sol prepared in Example I was concentrated by evaporation at 100° C. intermittently over a period of several days. The unclad sol was placed in a round-bottom flask and heated with continuous stirring and with a slight reflux on the walls of the flask to avoid deposition of a solid material on the sides of the vessel. By the evaporation of water, the original 470 ml. of sol was concentrated to about 30 ml. and the percent solids in the sol was determined using standard techniques. The sol was found to contain 47.47% total solids. The concentration of urania was 38.75 grams per liter, and thoria was 580.5 grams per liter. This concentration is very close to the solids content obtained for straight thoria sols.

What is claimed is:

1. An aqueous thoria-urania sol stable at temperatures up to 150° C. and having a total solids content of up to 50% which comprises an aqueous dispersion of homogeneous particles of thoria and urania in the size range of 200 to 1125 angstrom units in which both components are in the plus IV oxidation state and the urania content is greater than 10 to 99%.

2. An aqueous thoria-urania sol stable at temperatures up to 150° C. comprising an aqueous dispersion of thoria-urania particles in the size range of 200 to 1125 angstrom units in which both components are in the plus IV oxidation state and the urania content is greater than 10 to 99%, having a coating of unreacted hydrous silica about 30 to 120 angstrom units thick, said sol containing sufficient sodium hydroxide to give a pH of 7 to 9 and having a specific conductance of $10^{-2}$ to $10^{-5}$ mho/cm. at 25° C.

3. A method of forming stable thoria-urania particles capable of forming a stable dispersion in water in which both the thoria and urania are in the plus IV oxidation state, comprising the steps of preparing an aqueous solution of thorium and uranium (IV) salts, withdrawing a portion of said solution, dialyzing said portion to remove anions and returning said portion to a larger body of solution and continuing said withdrawal, dialysis and return until said body of solution is substantially free of electrolytes.

4. A method for forming stable thoria-urania particles capable of forming a dispersion in water in which both the thoria and urania are in the plus IV oxidation state comprising the steps of preparing an aqueous solution of thorium and uranium (IV) chloride, withdrawing a portion of said solution, dialyzing said portion to remove anions and returning said portion to a larger body of solution and continuing said withdrawal, dialysis and return until said body of solution is substantially free of electrolytes.

5. A method for forming stable sols containing silica clad thoria-urania particles in which both the thoria and urania are in the plus IV oxidation state comprising the steps of preparing an aqueous solution of thorium and uranium (IV) chloride, withdrawing a portion of said solution, dialyzing said portion to remove anions and returning said portion to a larger body of solution and continuing said withdrawal, dialysis and return until said body of solution is substantially free of electrolytes, mixing a freshly prepared silica sol with said solution to provide the thoria-urania particles with a silica coating about 30 to 120 angstroms thick, adding sufficient sodium hydroxide to give a sol having a pH of 7 to 9 and a specific conductance of $10^{-2}$ to $10^{-5}$ mho/cm. at 25° C.

6. A method for forming stable sols containing silica clad thoria-urania particles in which both the thoria and urania are in the plus IV oxidation state compising the steps of preparing an aqueous solution of thorium and uranium (IV) chloride, withdrawing a portion of said solution, dialyzing said portion to remove anions and returning said portion to a larger body of solution and continuing said withdrawal, dialysis and return until sol formation is complete, lowering electrolyte concentration of the sol by passing it through a mixed bed anion-cation exchange resin, mixing a freshly prepared silica sol with said sol to provide thoria-urania particles with a silica coating about 30 to 120 angstroms thick, adding sufficient sodium hydroxide to give a sol having a pH of 7 to 9 and a specific conductance of $10^{-2}$ to $10^{-5}$ mho/cm. at 25° C.

References Cited

UNITED STATES PATENTS 3,091,592  5/1963  Fitch et al. _____ 252—301.1

CARL D. QUARFORTH, *Primary Examiner.*

LEON D. ROSDOL, *Examiner.*

L. A. SEBASTIAN, *Assistant Examiner.*